May 25, 1965 R. D. BRUBAKER 3,185,485

TONE ARM MOUNTED DUST REMOVER FOR PHONOGRAPH RECORD

Filed Sept. 26, 1962

INVENTOR
ROBERT DIXON BRUBAKER
BY
OSTROLENK, FABER, GERB & SOFFEN
ATTORNEYS

United States Patent Office 3,185,485

Patented May 25, 1965

3,185,485

TONE ARM MOUNTED DUST REMOVER FOR PHONOGRAPH RECORD

Robert D. Brubaker, Cleveland, Ohio, assignor, by mesne assignments, to Gerald J. Levy, Jackson Heights, N.Y.

Filed Sept. 26, 1962, Ser. No. 226,346
15 Claims. (Cl. 274—47)

The instant invention relates to devices for removing dust from the sound track of phonograph records and at the same time also removing the electrostatic charge that is generated when a phonograph record is played. More particularly, this invention relates to a device of this type which is mounted to the tone arm of an automatic record changer.

Although the instant invention is applicable to all forms of records having a sound groove, the invention is particularly useful with long-playing records in which the sound groove is very fine and the amounts of dust which would be unimportant with short-playing records cause considerable undesirable noise. Dust particles in the sound groove force the sound groove to lose control of the play-back stylus, distort the tracking, and downgrade the quality of even the finest reproduction.

In the prior art, there are devices for neutralizing the electrostatic charge and removing dust particles from the sound groove. However, these devices are restricted to operation with so-called turntables and are not suitable for operation with automatic record changers.

The instant invention provides a device which is mounted to the tone arm of an automatic record changer and operates in a manner to clear the record sound groove so as to minimize surface noise, minimize wear and tear on the groove wall and the stylus, thus allowing clear sound reproduction. This is achieved by neutralizing the electrostatic charge and by sweeping each groove just before it is played by the stylus.

Accordingly, a primary object of the instant invention is to provide a device utilizable with an automatic record changer for removing dust particles from the record sound groove and also neutralizing the electrostatic charge.

Another object of the instant invention is to provide a device of this type which is readily mountable to existing tone arms.

Still another object of the instant invention is to provide a device of this type which does not appreciably affect the over-all mass of the tone arm.

A further object of the instant invention is to provide a device of this type which neutralizes the electrostatic charge and clears the sound groove just before it is played by the phonograph stylus.

These as well as other objects of the instant invention shall become readily apparent after reading the following description of the accompanying drawings, in which.

Figures 1, 2, 3, 5:
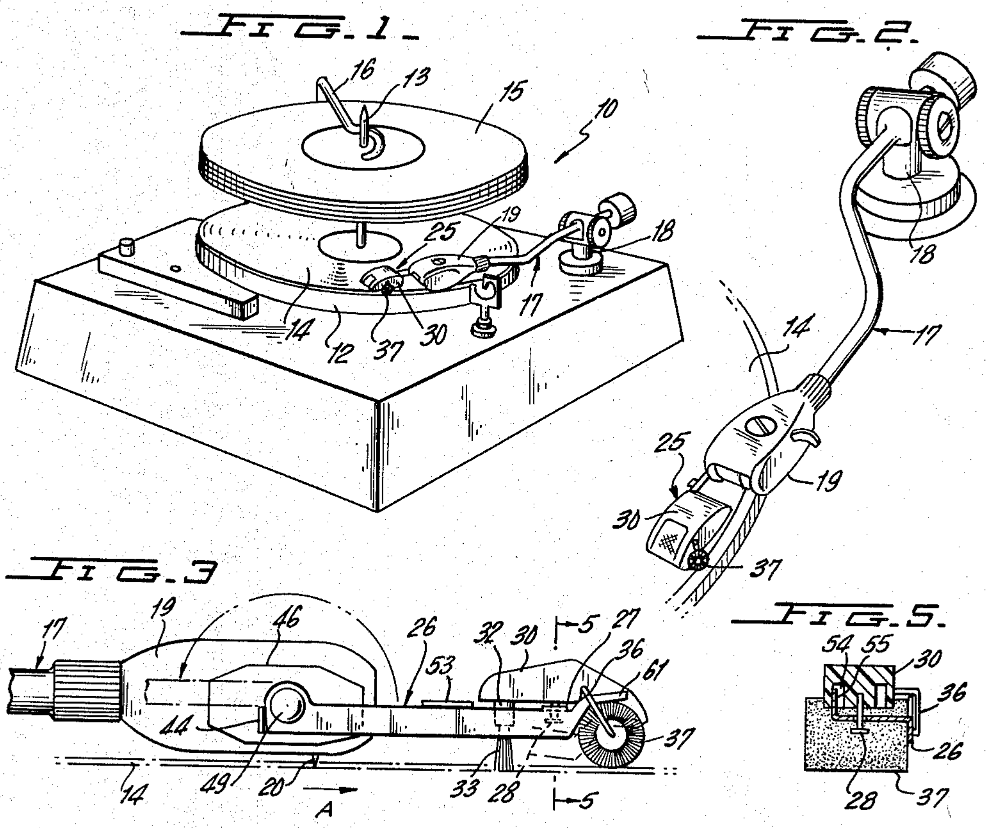
FIGURE 1 is a perspective illustrating an automatic record changer having the dust remover of the instant invention incorporated therein.
FIGURE 2 is an enlarged perspective in greater detail, illustrating the tone arm and dust remover of FIGURE 1.
FIGURE 3 is a side elevation showing the dust remover mounted to the tone arm.
FIGURE 5 is a cross-section taken through lines 5—5 of FIGURE 3 looking in the direction of arrows 5—5.
Figure 4:
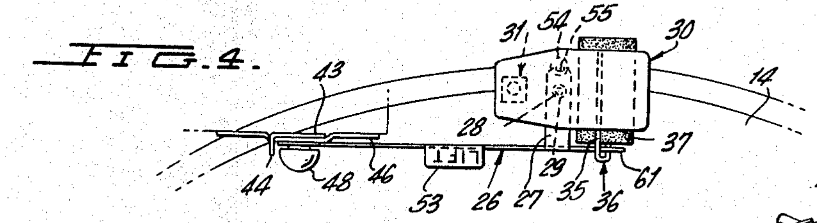
FIGURE 4 is a plan view of the dust remover.

Briefly, the device of the instant invention comprises a plush pad which carries a fluid to neutralize the electrostatic charge. The plush pad is carried by a plastic body mounted to a bendable arm which, in turn, is secured to means for mounting the dust remover to a tone arm. This last means includes a mounting means in the form of a spring clip or a pad with a coating of pressure sensitive adhesive material which directly secures the dust remover to the tone arm. The connection between the dust remover arm and the mounting means includes a pin which provides a horizontal axis about which the dust remover arm is movable.

The mounting between the body and the dust remover arm provides a vertical axis about which the body is pivotable relative to the arm, with this movement being limited by suitable stops. The connection between the body and dust remover arm is such that the body is also permitted to move vertically. It is noted that the body also carries a brush whose bristles extend into the record sound groove to remove dust therefrom and also provide means for tracking the dust remover so that the latter does not impose an additional tracking load upon the stylus.

Now referring to the figures, automatic record changer 10 includes base 11 to which platter 12 is mounted for rotation about spindle 13. Phonograph record 14 is shown in playing position resting upon platter 12 and a stack of phonograph records 15 is shown raised above record 14 in position to descend one by one into playing position. Control arm 16 stabilizes the position of record stack 15 in a manner well known to the art. Tone arm 17 is pivotally mounted to post assembly 18 which extends upwardly from the top surface of base 11 with the free end of tone arm 17 including removable housing 19 wherein a phonograph pick-up unit (not shown) is disposed. Record playing stylus 20 comprises a portion of this pick-up unit. Dust remover 25 is mounted to tone arm 19 so as to be bodily movable therewith as tone arm 17 is raised and lowered during record changing operations.
is raised and lowered during record changing operations.

More particularly, dust remover 25 includes support arm 26 having a generally horizontal offset portion 27. Rivet 28 extends upwardly through aperture 29 in offset portion 27 and is force-fitted into an aperture of molded body member 30 so as to mount the latter to support arm 26. Holder 32 of brush assembly 31 is secured to body 30 at the rear thereof with the brush assembly bristles 33 extending downwardly from body 30. The opposite sidewalls of body 30 are provided with vertical slots 34 having bottom openings which receive arm 35 of U-shaped pad holder 36. Plush pad 37 is a cylindrical member mounted to the other arm 38 of pad holder 36 with plush pad 37 being positioned below body 30 and extending forwardly of brush assembly 31.

The rear portion of support arm 26 is provided with aperture 41 which receives horizontal extending pin 42 constituting a pivotal support for arm 26. Pivot pin 42 is riveted to pivot plate 43 with the latter including an offset stop portion 44 preventing the dust remover from dropping below the horizontal plane when the tone arm lifts. The end of pivot pin 42 remote from pivot plate 43 is force-fitted into aperture 48 of closure button 49 with button 49 preventing accidental dismounting of support arm 26 from pivot pin 42. When stylus 20 is lifted from a record, stop 44 engages the rear end of arm 26 to prevent dust remover 25 from dropping from a substantially horizontal position.

Surface 51 of mounting pad 46 is coated with a pressure sensitive adhesive. During shipment of dust remover 25 separate and apart from a tone arm, surface 51 is covered by a suitable removable backing sheet (not shown).

Mounting of dust remover 25 to tone arm 17 takes place as follows:

(1) The backing sheet is removed from mounting pad surface 51.

(2) Pad 46 is mounted to tone arm pick-up housing 19 in the position illustrated in FIGURE 3.

(3) Support arm 26 is bent so that brush bristles 33 start at the sound grooves when stylus 20 is placed on the lead-in groove of phonograph record 14, as shown in FIGURE 2.

(4) While the effect of dust remover 25 on the mass of tone arm 17 is typically less than one-half gram, the stylus force may be re-adjusted to cancel the slight additional weight.

(5) Support arm 26 is pivoted counter-clockwise with respect to FIGURE 3 about pin 42, by utilizing lift projection 53, to a position wherein plush pad 37 is above tone arm 17. With pad 37 in this position, a charge neutralizing fluid, such as a mixture of water and ethylene glycol, is applied to pad 37.

(6) Pad 37 is then moved to a position forward of pivot pin 42, as in FIGURE 3, and operation of record changer 10 may proceed in the accustomed manner.

It is noted that when tone arm 17 is lifted above platter 12 sufficiently so that pad 37 and brush 33 are no longer resting upon record 14, the clockwise movement (with respect to FIGURE 3) of support arm 26 about pivot pin 42 is limited by the engagement of the rear edge of support arm 26 with stop 44. As seen in FIGURE 3, the rear edge of support arm 26 is spaced from stop 44 when stylus 20 is in the sound groove. This permits a limited pivotal movement of pad 37 about pin 42. With tone arm 17 lifted, forward, extension 61 of support arm 26 is engaged by pad holder arm 35 to stabilize the position of body 30. It is noted that arm 26 may be moved to an inactive rearward extending position shown in phantom in FIGURE 3, to rest upon stop 44, when phonograph operation is desired without utilizing dust remover 25.

Further limited movement in a vertical direction is, as best seen in FIGURE 5, permitted by the loose connection between rivet 28 and support arm extension 27. Pivotal movement of body 30 about the vertical axis defined by rivet 28 may also take place. This movement is limited by the cooperation of cavity 54 in the bottom of body 30 and upward projection 55 at the free end of support arm extension 27.

In operation, with the sound groove of the record moving in the direction indicated by arrow A of FIGURE 3, the fine relatively stiff nylon brush fibers 33 entering one or more of the sound grooves eject dust from these grooves and also serve to cause the body 30 to track over the record. The dust so ejected is collected by pad 37 with the fluid moistened pad 37 serving as a cleaning agent and also serving to remove the electrostatic charge from the records so that the dust particles do not adhere to the record.

Figure 7:
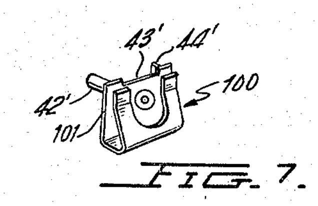
FIGURE 7 is a perspective of a mounting clip.
Figure 6:
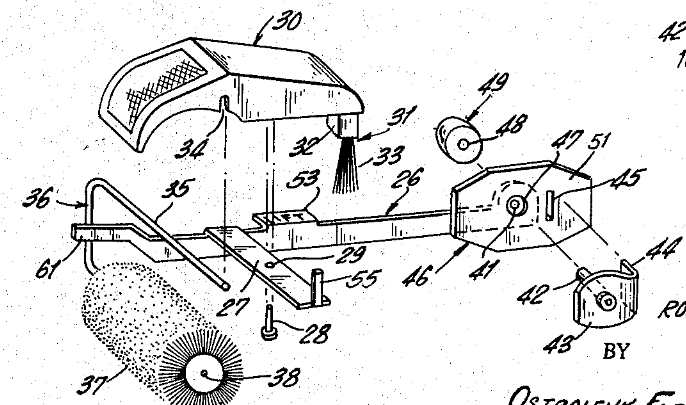
FIGURE 6 is an exploded perspective of the dust remover assembly.

FIGURE 7 illustrates mounting means 100 which may replace pad 46, plate 43, and pivot pin 42. Mounting means 100 comprises generally U-shaped spring clip 43'. The arms of clip 43' are closely spaced and are adapted to receive therebetween the edge of a hollow tone arm. Pivot pin 42' extends sideways from clip arm 101 through the rear aperture of support arm 26 with the end of pin 42' remote from arm 101 being engageable by button 49. Stop 44' also extends sideways from arm 101 and cooperates with support arm 26 in the manner previously described for stop 44.

Thus, it is seen that this invention provides a novel construction for a dust remover which is utilized in conjunction with an automatic record changer. The device includes means for removing dust from the record sound grooves and also means for neutralizing electrostatic charge so that the dust removed from the sound grooves is readily removable from the record. Further the dust remover is constructed so as to be readily mountable to existing tone arms without adding appreciable mass thereto.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device of the class described for cleaning a phonograph record, said device comprising a body member, a brush mounted to said member, a pad of fibrous material mounted to said member and operatively positioned to ride along the surface of a record, said brush having relatively stiff fibers operatively positioned so that the tips thereof ride in the sound groove of a record while the pad is on the record surface, a support arm, said body mounted to said arm near one end thereof, and first means at the other end of said arm for mounting said device to a phonograph tone arm on a generally horizontal axis with the body member positioned forward of the tone arm free end, said first means and said support arm engageable with one another to limit movement of said support arm about said generally horizontal axis.

2. The device of claim 1 in which there is a second means defining a vertical axis which mounts the body to the support arm, means for limiting movement of said body about said vertical axis relative to said support arm, said second means constructed to permit limited movement of said body along said vertical axis relative to said support arm.

3. The device of claim 1 in which the first means comprises mounting clip, a pin mounted to said mounting clip and extending horizontally from the surface of said mounting clip opposite to said one surface, said support arm being pivotally mounted to said pin.

4. The device of claim 3 in which there is a stop means carried by said clip and engageable with said support arm to appropriately position said support arm when the brush fibers and the pad of fibrous material are not in engagement with a record.

5. The device of claim 4 in which there is a second means defining a vertical axis which mounts the body to the support arm, means for limiting movement of said body about said vertical axis relative to said support arm, said second means constructed to permit limited movement of said body along said vertical axis relative to said support arm.

6. The device of claim 5 in which there is a forward extension of said support arm operatively positioned for engagement by the means mounting said pad of fibrous material to said body member whereby the position of said body member is stabilized when the brush fibers and the pad of fibrous material are not in engagement with a record.

7. The device of claim 2 in which the first means comprises a mounting clip, a pin mounted to said mounting clip and extending horizontally from the surface of said mounting clip opposite to said one surface, said support arm being pivotally mounted to said pin.

8. The device of claim 7 in which there is a stop means carried by said clip and engageable with said support arm to appropriately position said support arm when the brush fibers and the pad of fibrous material are not in engagement with a record.

9. The device of claim 3 in which the first means also comprises a mounting pad having a surface coated with pressure actuated adhesive, said mounting clip being mounted to said mounting pad.

10. The device of claim 1 in which the first means comprises a generally U-shaped spring mounting clip, a pin mounted to one of the U-arms of said clip and extending outboard therefrom in a generally horizontal direction, and a pivotal connection between said support arm and said pin.

11. The device of claim 10 in which there is a stop means carried by said clip and engageable with said support arm to appropriately position said support arm when the brush fibers and the pad of fibrous material are not in engagement with a record.

12. The device of claim 11 in which there is a second means defining a vertical axis which mounts the body to the support arm, means for limiting movement of said body about said vertical axis relative to said support arm, said second means providing a loose fit between said body and said support arm to permit movement of said body along said vertical axis relative to said support arm, said second means having formations to limit the extent of this movement along the vertical axis.

13. The device of claim 12 in which there is a forward extension of said support arm operatively positioned for engagement by the means mounting said pad of fibrous material to said body member whereby the position of said body member is stabilized when the brush fibers and the pad of fibrous material are not in engagement with a record.

14. The device of claim 1 in which the support arm is movable about said generally horizontal axis to an extent that said brush and said pad are movable rearward of said generally horizontal axis to an inactive position while said device is mounted to a tone arm.

15. The device of claim 1 in which said pad is forward of said brush when said body member is positioned forward of a tone arm free end.

References Cited by the Examiner

UNITED STATES PATENTS

| | | | |
|---|---|---|---|
| 2,294,660 | 9/42 | Hess | 274—47 |
| 2,295,798 | 9/42 | McKinley | 274—47 |
| 2,958,529 | 11/60 | King | 274—47 |

FOREIGN PATENTS

| | | |
|---|---|---|
| 817,598 | 8/59 | Great Britain. |

NORTON ANSHER, *Primary Examiner.*